(12) United States Patent
Morello

(10) Patent No.: US 11,452,394 B2
(45) Date of Patent: Sep. 27, 2022

(54) MEASURED POWDER DISPENSER

(71) Applicant: Silvio Morello, Sydney (AU)

(72) Inventor: Silvio Morello, Sydney (AU)

( * ) Notice: Subject to any disclaimer, the term of this patent is extended or adjusted under 35 U.S.C. 154(b) by 0 days.

(21) Appl. No.: 17/310,097

(22) PCT Filed: Dec. 13, 2019

(86) PCT No.: PCT/AU2019/051376
§ 371 (c)(1),
(2) Date: Jul. 16, 2021

(87) PCT Pub. No.: WO2020/146917
PCT Pub. Date: Jul. 23, 2020

(65) Prior Publication Data
US 2022/0110467 A1 Apr. 14, 2022

(30) Foreign Application Priority Data
Jan. 17, 2019 (AU) ................................. 2019900139

(51) Int. Cl.
*A47G 19/34* (2006.01)
*G01F 11/24* (2006.01)
*A47J 47/01* (2006.01)
*A47J 47/16* (2006.01)

(52) U.S. Cl.
CPC .............. *A47G 19/34* (2013.01); *A47J 47/01* (2013.01); *A47J 47/16* (2013.01); *G01F 11/24* (2013.01)

(58) Field of Classification Search
CPC . G01F 11/24; A47G 19/34; A47J 47/01; A47J 47/16

USPC ........................................................ 222/129
See application file for complete search history.

(56) References Cited

U.S. PATENT DOCUMENTS

| 1,982,917 | A |   | 12/1934 | Lothrop et al. |
|---|---|---|---|---|
| 4,019,660 | A |   | 4/1977 | Berkey |
| 4,079,860 | A | * | 3/1978 | Maves ................ G01F 11/24 384/276 |

(Continued)

OTHER PUBLICATIONS

International Preliminary Report on Patentability (Chapter II) dated Nov. 25, 2020 from PCT Application No. PCT/AU2019/051376.

(Continued)

*Primary Examiner* — Jeremy Carroll
(74) *Attorney, Agent, or Firm* — Innovation Capital Law Group, LLP; Vic Lin

(57) ABSTRACT

A measured powder dispenser has a hopper feeding powder down into a measured dispensing mechanism. The measured dispensing mechanism has an inlet and an outlet and a measuring container operable therebetween. The measuring container is rotatably engaged about a rotation axis generally orthogonal to an inlet axis of the inlet such that an exterior surface thereof moves across the inlet when the measuring container rotates. The measuring container has an interior volume adjustable measurement chamber recessed within the exterior surface such that, in use, at a first rotational position, the measurement chamber aligns with the inlet to accept a measured amount of powder therein from the power container and, when rotated to a second rotational position, the exterior surface seals across the inlet and the measurement chamber aligns with the outlet to dispense the measured amount of powder therefrom.

24 Claims, 4 Drawing Sheets

(56) References Cited

U.S. PATENT DOCUMENTS

| | | | | |
|---|---|---|---|---|
| 4,162,751 | A | 7/1979 | Hetland et al. | |
| 5,375,744 | A | 12/1994 | Henderson | |
| 6,189,742 | B1* | 2/2001 | Thomson | A47G 19/34 222/362 |
| 8,302,803 | B1* | 11/2012 | Greenberg | B65D 81/3211 222/129 |
| 2003/0234264 | A1* | 12/2003 | Landau | A47G 19/34 222/368 |
| 2007/0181604 | A1* | 8/2007 | Rusch | G01F 11/24 222/363 |
| 2014/0263471 | A1 | 9/2014 | Gonzalez et al. | |
| 2015/0276453 | A1* | 10/2015 | Rusch | G01F 11/24 222/370 |
| 2017/0219404 | A1* | 8/2017 | Singer | G01F 15/005 |

OTHER PUBLICATIONS

International Search Report & Written Opinion dated Feb. 7, 2020 from PCT Application No. PCT/AU2019/051376.

* cited by examiner

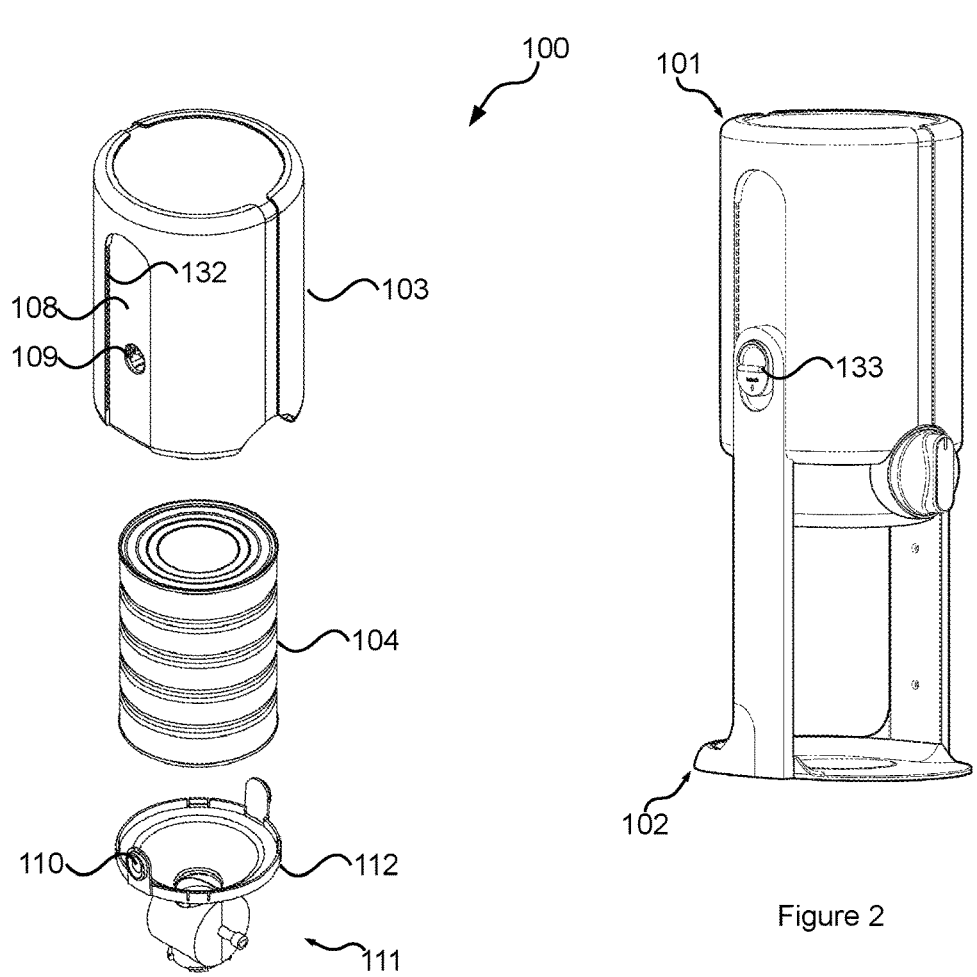
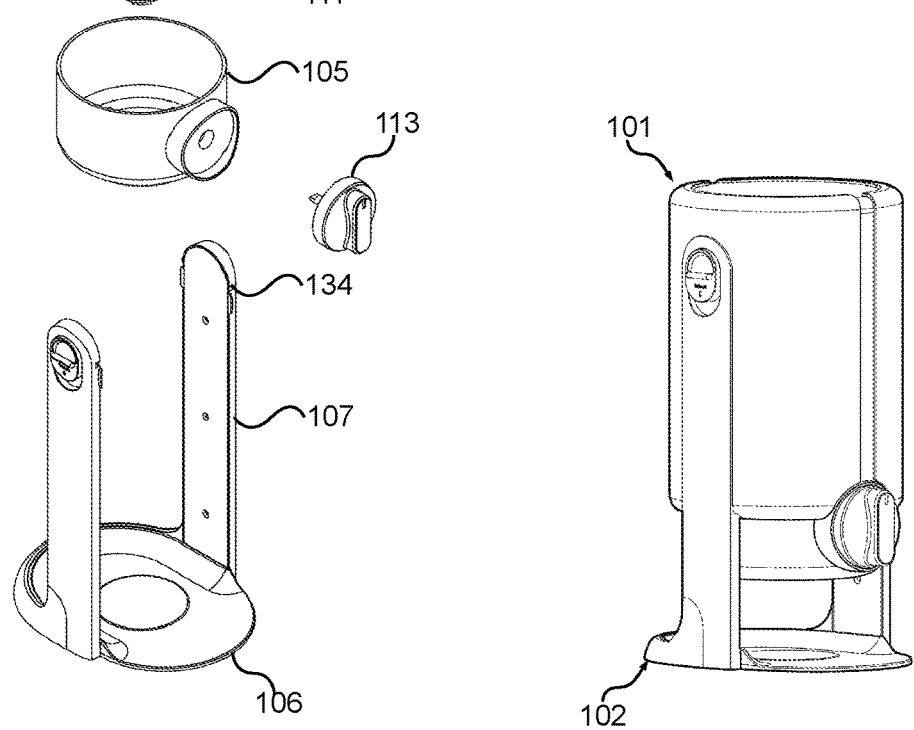
Figure 1
Figure 2
Figure 3

MEASURED POWDER DISPENSER

FIELD OF THE INVENTION

This invention relates generally to a dispenser for dispensing a measured amount of powder, such as powdered milk.

SUMMARY OF THE DISCLOSURE

According to one aspect, there is provided a measured powder dispenser comprising a hopper feeding powder down into a measured dispensing mechanism, the measured dispensing mechanism having an inlet and an outlet and a measuring container operable therebetween, the measuring container rotatably engaged about a rotation axis generally orthogonal to an inlet axis of the inlet such that an exterior surface thereof moves across the inlet when the measuring container rotates and wherein the measuring container comprises a measurement chamber recessed within the exterior surface and wherein the measurement chamber comprises a platform able to be offset at various depths within the measurement chamber to adjust an interior volume of the measurement chamber such that, in use, at a first rotational position, the measurement chamber aligns with the inlet to accept a measured amount of powder therein from the power container to fill the interior volume thereof and, when rotated to a second rotational position, the exterior surface seals across the inlet and the measurement chamber aligns with the outlet to dispense the measured amount of powder therefrom.

The platform may comprise a threaded periphery which screws into corresponding inner threading of the measurement chamber.

An upper surface of the platform may comprise an engagement for turning the platform.

The exterior surface may comprise a cylindrical cross-section.

The measuring container may be rotatably contained within a housing.

The exterior surface may comprise a cylindrical cross-section and an interior surface of the housing may comprise a cylindrical cross-section.

The dispenser may comprise an interface plate interfacing the hopper and the measured dispensing mechanism and wherein the housing may comprise an upper locking collar which releasably locks to the interface plate at the inlet.

The dispenser may further comprise a base piece and the measured dispensing mechanism may comprise a lower locking collar which releasably locks to the base piece at the outlet.

The lower locking collar may be configured to lock the measuring container in a particular rotational position with respect to the base piece such that the measuring container aligns with a turning knob of the base piece.

The housing may be split into bifurcations which can be pulled apart to release the measuring container therein therefrom.

When at least one of the upper and lower locking collars are locked to the interface plate or base piece respectively the bifurcations may be held together.

The housing may comprise an aperture and a proximal face of the measuring container may comprise a turning shaft for a turning knob.

The hopper may comprise a base piece and the base piece may comprise an aperture for the turning shaft.

The turning shaft may be disassemblable such that the turning knob can be pulled from the measuring container to remove the measuring container from the base piece.

The turning shaft may comprise a proximal piece connectable to a distal piece and wherein a proximal piece extends to within the aperture of the base piece.

The turning knob may be biased to a rotational position by a biasing mechanism.

The turning knob may comprise a visual indicator for ascertaining the rotational position of the measuring container.

The hopper may comprise a cowl and a base piece which couple together to enclose an inverted powder tin therebetween.

The base piece may comprise an interface plate which interfaces an opening of the powder tin.

The interface plate may comprise locking tabs which lock against a rim of the powder tin.

The interface plate may comprise locking tabs which lock into corresponding apertures of the hopper.

The hopper may be supported atop a stand.

The stand may comprise a stand plate and a pair of upright posts which engage the hopper.

The hopper may comprise recessed tracks within which upper distal ends of the upright posts may be slidably engaged.

The recess tracks comprise racks caught by locking pins extending from the upper distal ends of the upright posts.

Each post may comprise a latch which, when displaced, pulls in the locking pins.

According to another aspect, there is provided a method of dispensing a measured amount of powder using the dispenser, the method comprising adjusting the depth of the platform to configure an interior volume of the measurement chamber, loading the hopper with powder, turning the measurement chamber to the first rotational position to accept the measured amount of powder into the measurement chamber and turning the measurement chamber two the second rotational position to dispense the measured amount of powder therefrom.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows an exploded perspective view of a measured powder dispenser in accordance an embodiment;

FIGS. 2 and 3 show the assembled dispenser in extended and retracted positions respectively;

DESCRIPTION OF EMBODIMENTS

Figure 4:
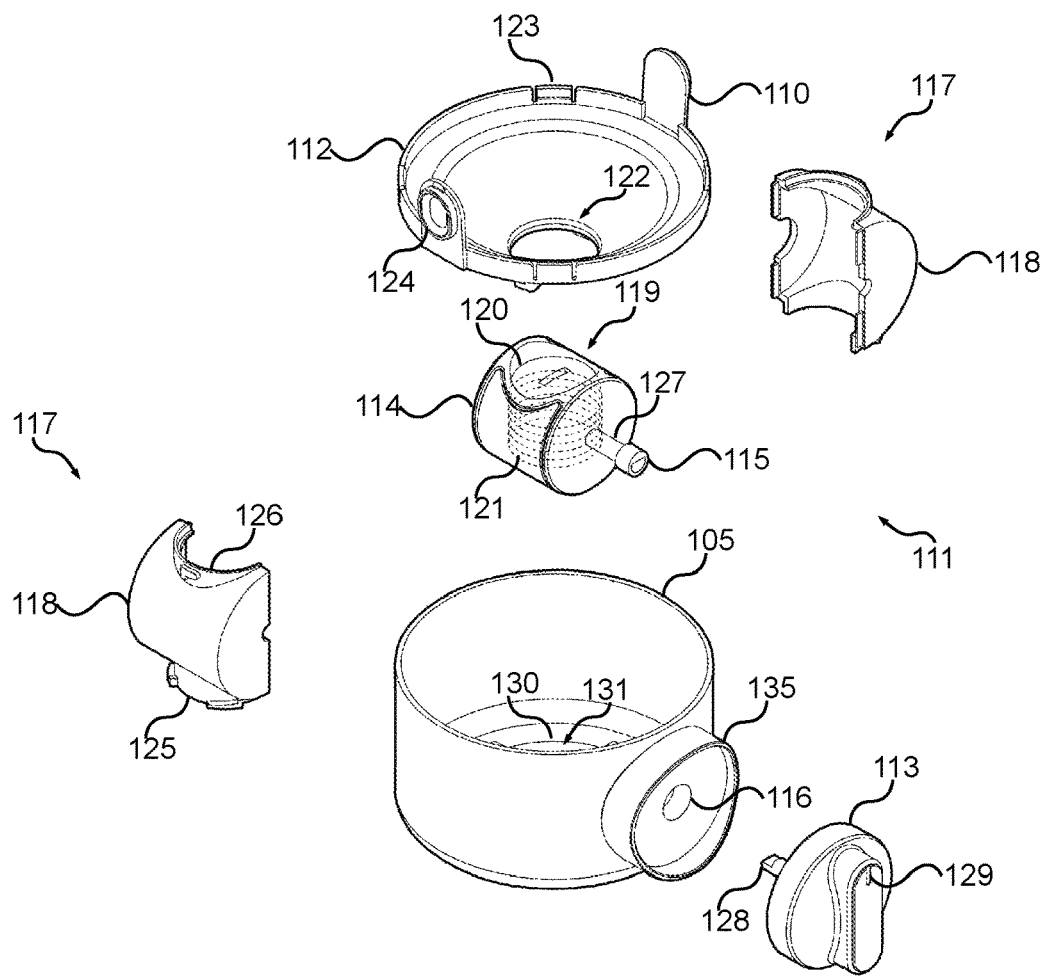
FIGS. 4 and 5 show exploded and assembled representations respectively of a measured dispensing mechanism of the dispenser in accordance with an embodiment.
Figure 5:
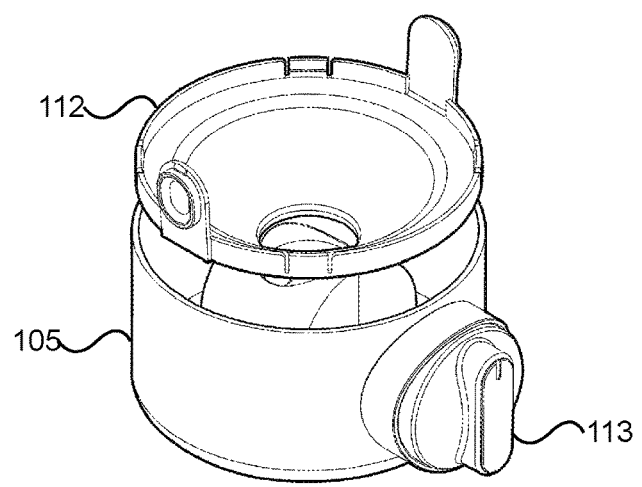

A measured powder dispenser 100 comprises a hopper 101 feeding down into a dispensing mechanism 111 for dispensing a measured amount of powder. The hopper 101 may be supported atop a stand 102.

The hopper 101 may comprise a cowl 103 and a base piece 105 which may enclose an inverted commercially available tin 104 of powder therebetween. An interface plate 112 may interface the opening of the tin 104 and the dispensing mechanism 101.

The stand 102 may comprise a stand plate 106 and a pair of upright support posts 107. Upper distal ends of the support posts 107 may slide within corresponding recessed tracks 108 of the cowl 103 to raise the height the container 101 in the manner shown in FIG. 2 and to lower the container 101 in the manner shown in FIG. 3.

The interface plate 112 may comprise locking tabs 110 which lock into corresponding apertures 109 of the cowl 103 to hold the interface plate 102 in position. In this manner, the dispensing mechanism 101 and the base piece 105 may be suspended from the interface plate.

Opposite edges of the recessed tracks 108 may comprise racks 132 caught by locking pins extending from side apertures 134 of upper distal ends of the posts 107 to hold the container 101 in place at various vertical offsets. Pressing down of a latch 133 retracts the locking pins, thereby allowing the posts 107 to slide freely within the recessed tracks 108 when adjusting the height of the hopper 101.

With reference to FIG. 4, the dispensing mechanism 111 comprises a measuring container 114 rotatably engaged between an inlet 122 and an outlet 131.

The measuring container 114 is rotatably engaged about a rotation axis being generally perpendicular with a coaxial axis of the inlet 122 and outlet 131 such that an exterior surface 121 thereof moves across the inlet 122 and outlet 131. The measuring container 114 is preferably cylindrical as shown or at least is partially semicylindrical so as to be able to seal across the inlet 122 when rotated.

The measuring container 114 comprises a measurement chamber 119 recessed within the exterior surface 121 thereof.

Figure 6:
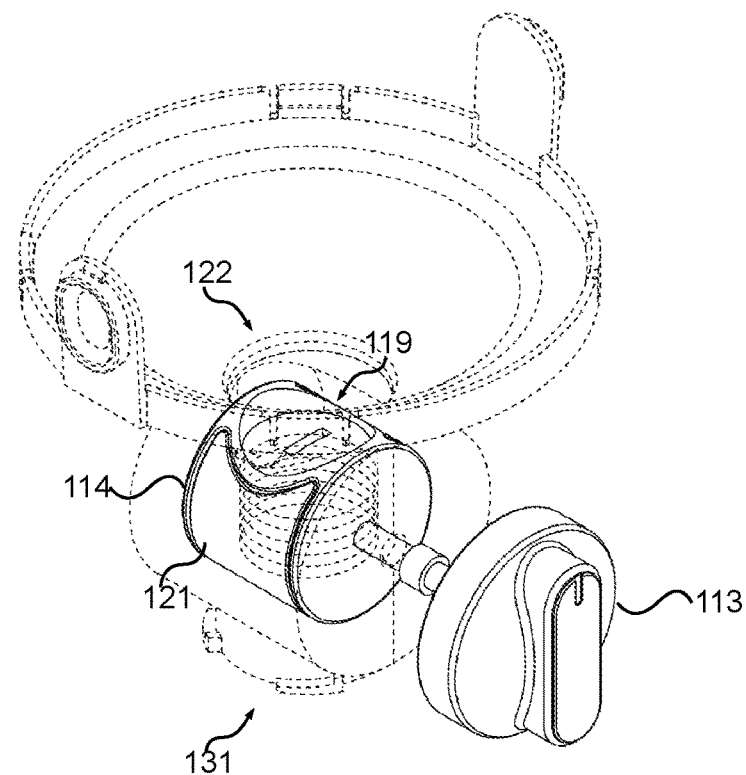
FIGS. 6 and 7 illustrates the measured dispensing mechanism operative between two rotational positions for dispensing of a measured amount of powder.

As shown in FIG. 6, in a first rotational position, the measurement chamber 119 aligns with the inlet 122 to accept a measured amount of powder from the container 101.

Figure 7:
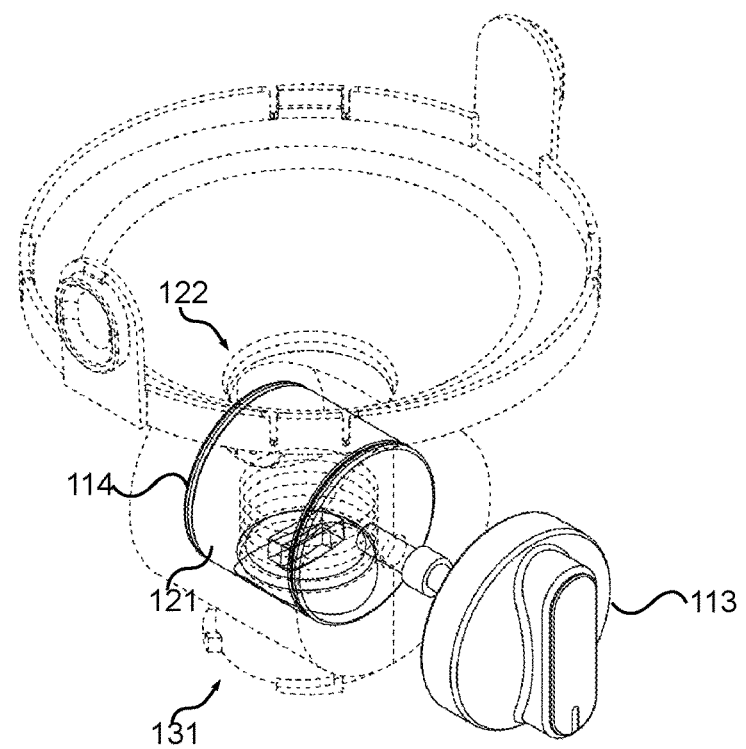

When rotated to a second rotational position shown in FIG. 7 (which may be 180° with respect to the first rotational position), the measurement chamber 119 aligns with the outlet 131, thereby dispensing the measured amount of powder therefrom.

When rotated from the first rotational position to the second rotational position, the exterior surface 121 of the measuring container 114 seals across the inlet 122.

In a preferred embodiment, the measuring container 114 comprises a platform 120 able to be offset at various depths within the measurement chamber 119 to adjust the interior volume of the measurement chamber 119 to control the amount of powder accepted by the measurement chamber 119.

The platform 120 may comprise a threaded periphery which screws into interior threading 121 of the measurement chamber 119. The platform 120 may comprise an engagement 14 to assist turning of the platform 120. In the embodiment shown in FIG. 4, the platform 120 comprises a recessed slot in an upper surface thereof within which a screwdriver may be engaged to turn the platform 120.

The measuring container 114 may comprise a turning shaft 127 extending from a proximal face thereof which engages a turning knob 113. The turning knob 113 may comprise a visual indicator 129 for visually ascertaining the operational position of the measuring container 114 in use.

The turning shaft 127 may extend through an aperture 116 of the base piece 105.

The turning shaft 127 may be disassemblable in comprising a proximal piece having a socket 115 within which a corresponding spade 128 of a distal piece releasably engages. In this way, the turning knob 113 may be pulled from the measuring container 114 to remove the measuring container 114 from the base piece 105. The proximal piece may be short so as to terminate at or just within the aperture 116 such that when the shaft 127 is disassembled, the measuring container 140 may be lifted from the base piece 105.

The turning knob 113 may be recessed within an annulus 135. A biasing mechanism (such as a coil spring) may bias the turning knob 113 to a particular rotational position, such as the first rotational position shown in FIG. 6.

The measuring container 114 may be rotatably engaged within a housing 117. The housing 117 may comprise a cylindrical inner surface so as to tightly conform with the exterior surface 121 of the measuring container 114.

The housing 117 may comprise an upper locking collar 126 which locks with a corresponding locking collar underneath the entrance 122 of the interface plate 112.

The housing 117 may further comprise a lower locking collar 125 which locks into a corresponding locking collar at the exit 131 of the base piece 105.

In embodiments, the locking collars 125, 126 comprise quarter turn engagements. The engagement may be configured such that, when interlocked, the measuring container 114 operably aligns with the turning knob 113.

As such, the dispenser 100 may be disassembled by releasing the locking collars 126, 125.

In a preferred embodiment, the housing 117 is split into bifurcations 118. Furthermore, in a preferred embodiment, when the locking collars 125, 126 are engaged, the bifurcations 118 are held together. However, when the locking collars 125, 126 are released, the bifurcations 180 may be pulled apart to release the measuring container 114 therein therefrom for adjustment and/or cleaning.

The interface plate 112 may comprise locking tabs 123 which lock against the rim of the tin 104. The interface plate 112 may be sized and shaped to accommodate a commercially available powder tin, such as one comprising 800 g of powder therein.

The interface plate 112 may funnel towards the inlet 122.

The locking tabs 110 may comprise protrusions 124 which engage in the apertures 109. Depressing the protrusions 124 within the apertures 110 flexes the tabs 110 and disengages the protrusions 124 from the apertures, thereby allowing the removal of the interface plate 112.

Figures 8, 9:
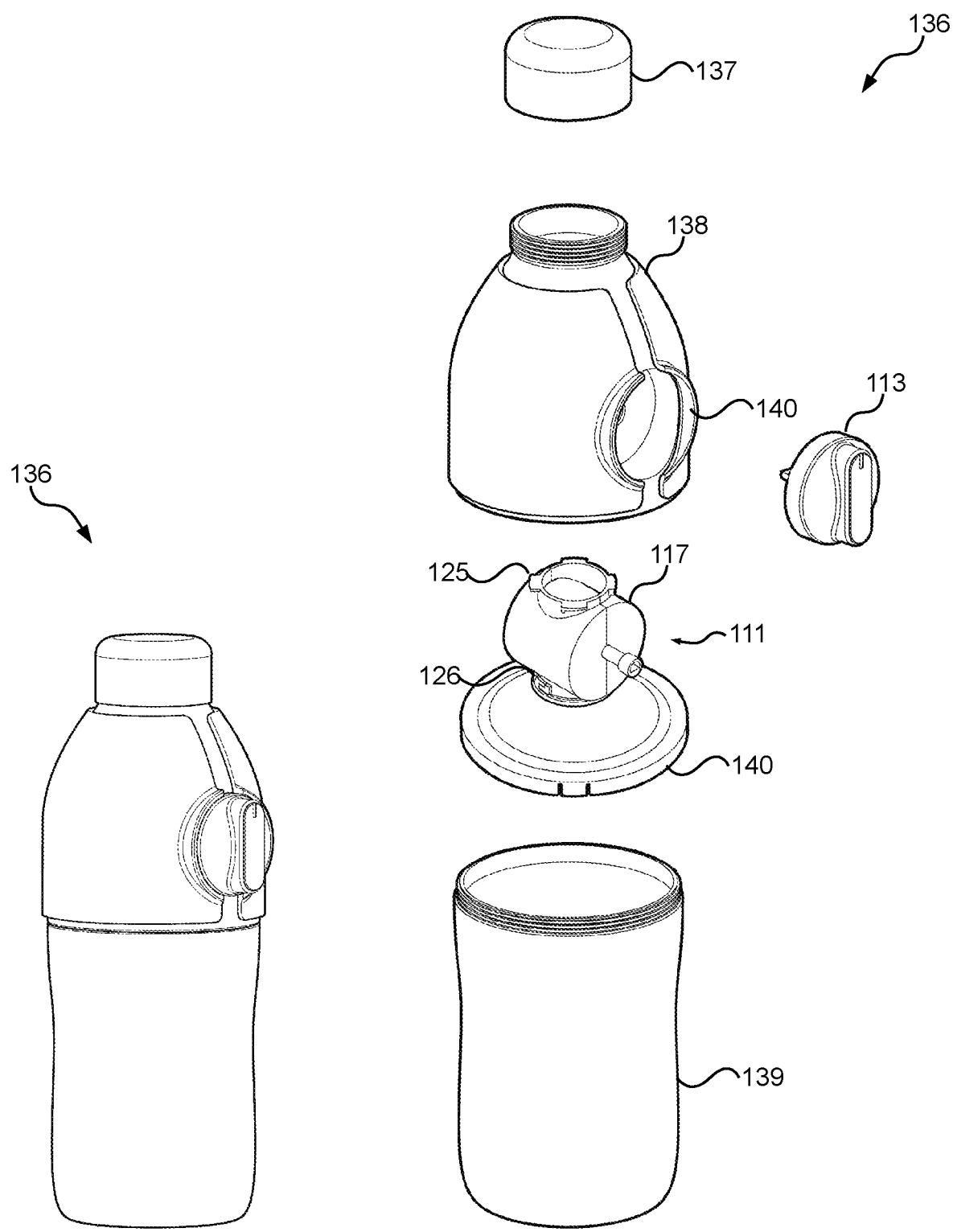
FIGS. 8 and 9 show a portable dispenser variant.

FIGS. 8 and 9 show a portable dispenser variant 136 which comprises an upper bottle piece 138 (akin to the base piece 105) lower bottle piece 139 (akin to the cowl 103) which screw together to hold an interface plate 140 (akin to the interface plate 112) therebetween.

The portable dispenser variant 136 may yet comprise the same dispensing mechanism 111 such that the dispensing mechanism 111 may be interchanged between the portable variant 136 and the non-portable variant 100. The upper bottle piece 138 may comprise an aperture 140 via which the turning knob 113 interfaces with the dispensing mechanism 111.

The upper bottle piece 138 may comprise threading for a screw cap 137.

In the portable dispenser variant 136, the upper locking collar 126 may yet lock to the interface plate 140 and the lower locking collar 125 may remain free or alternatively interlock with the upper bottle piece 138. In either manner, the upper locking collar 126 may be disengaged to disassemble the housing 117 for maintenance and adjustment.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A measured powder dispenser comprising a hopper feeding powder down into a measured dispensing mechanism, the measured dispensing mechanism having an inlet and an outlet and a measuring container operable therebetween, the measuring container rotatably engaged about a rotation axis generally orthogonal to an inlet axis of the inlet such that an exterior surface thereof moves across the inlet when the measuring container rotates and wherein the measuring container comprises a measurement chamber recessed within the exterior surface and wherein the measurement chamber comprises a platform able to be offset at various depths within the measurement chamber to adjust an interior volume of the measurement chamber such that, in use, at a first rotational position, the measurement chamber aligns with the inlet to accept a measured amount of powder therein from the power container to fill the interior volume thereof and, when rotated to a second rotational position, the exterior surface seals across the inlet and the measurement chamber aligns, with the outlet to dispense the measured amount of powder therefrom, wherein the hopper comprises a cowl and a base piece, the base piece having the measured dispensing mechanism, the cowl and the base piece coupling together to enclose an inverted powder tin therebetween, the base piece comprising an interface plate which interfaces an opening of the powder tin and the hopper is supported atop a stand comprising a pair of upright posts which slidably engage the cowl either side thereof for height adjustment of the base piece.

2. The dispenser as claimed in claim 1, wherein the platform comprises a threaded periphery which screws into corresponding inner threading of the measurement chamber.

3. The dispenser as claimed in claim 2, wherein an upper surface of the platform comprises an engagement for turning the platform.

4. The dispenser as claimed in claim 1, wherein the exterior surface comprises a cylindrical cross-section.

5. The dispenser as claimed in claim 1, wherein the measuring container is rotatably contained within a housing.

6. The dispenser as claimed in claim 5, wherein the exterior surface comprises a cylindrical cross-section and wherein an interior surface of the housing comprises a cylindrical cross-section.

7. The dispenser as claimed in claim 5, wherein the housing comprises an upper locking collar which releasably locks to the interface plate at the inlet.

8. The dispenser as claimed in claim 5, wherein the measured dispensing mechanism comprises a lower locking collar which releasably locks to the base piece at the outlet.

9. The dispenser as claimed in claim 8, wherein the lower locking collar is configured to lock the measuring container in a particular rotational position with respect to the base piece such that the measuring container aligns with a turning knob of the base piece.

10. The dispenser as claimed in claim 7 or 8, wherein the housing is split into bifurcations which can be pulled apart to release the measuring container therein therefrom.

11. The dispenser as claimed in claim 10, wherein, when at least one of the upper and lower locking collars are locked to the interface plate or base piece respectively the bifurcations are held together.

12. The dispenser as claimed in claim 5, wherein the housing comprises an aperture and wherein a proximal face of the measuring container comprises a turning shaft for a turning knob.

13. The dispenser as claimed in claim 12, wherein the base piece comprises an aperture for the turning shaft.

14. The dispenser as claimed in claim 13, wherein the turning shaft is disassemblable such that the turning knob can be pulled from the measuring container to remove the measuring container from the base piece.

15. The dispenser as claimed in claim 14, wherein the turning shaft comprises a proximal piece connectable to a distal piece and wherein a proximal piece extends to within the aperture of the base piece.

16. The dispenser as claimed in claim 12, wherein the turning knob is biased to a rotational position by a biasing mechanism.

17. The dispenser as claimed in claim 16, wherein the turning knob comprises a visual indicator for ascertaining the rotational position of the measuring container.

18. The dispenser as claimed in claim 1, wherein the interface plate comprises locking tabs which lock against a rim of the powder tin.

19. The dispenser as claimed in claim 11, wherein the interface plate comprises locking tabs which lock into corresponding apertures of the hopper.

20. The dispenser as claimed in claim 1, wherein the stand comprises a stand plate.

21. The dispenser as claimed in claim 1, wherein the cowl comprises recessed tracks within which upper distal ends of the upright posts are slidably engaged.

22. The dispenser as claimed in claim 21., wherein the recess tracks comprise racks caught by locking pins extending from the upper distal ends of the upright posts.

23. The dispenser as claimed in claim 22, wherein each post comprises a latch which, when displaced, pulls in the locking pins.

24. A method of dispensing a measured amount of powder using a dispenser as claimed in claim 1, the method comprising adjusting the depth of the platform to configure an interior volume of the measurement chamber, loading the hopper with powder, turning the measurement chamber to the first rotational position to accept the measured amount of powder into the measurement chamber and turning the measurement chamber two the second rotational position to dispense the measured amount of powder therefrom.

* * * * *